United States Patent
Cho et al.

(10) Patent No.: US 9,008,423 B2
(45) Date of Patent: Apr. 14, 2015

(54) METHOD AND APPARATUS FOR DETECTING AND RECOGNIZING OBJECT USING LOCAL BINARY PATTERNS

(71) Applicant: Electronics and Telecommunications Research Institute, Daejeon (KR)

(72) Inventors: Kyu Bo Cho, Daegu (KR); Yun Su Chung, Daegu (KR); Kil Taek Lim, Daegu (KR); Eun Chang Choi, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 53 days.

(21) Appl. No.: 13/899,003

(22) Filed: May 21, 2013

(65) Prior Publication Data

US 2014/0193071 A1    Jul. 10, 2014

(30) Foreign Application Priority Data

Jan. 10, 2013    (KR) ........................ 10-2013-0002804

(51) Int. Cl.
*G06K 9/00*    (2006.01)

(52) U.S. Cl.
CPC .................................. *G06K 9/00771* (2013.01)

(58) Field of Classification Search
None
See application file for complete search history.

(56) References Cited

U.S. PATENT DOCUMENTS

| | | | | |
|---|---|---|---|---|
| 8,340,439 B2* | 12/2012 | Mitarai et al. | ................. | 382/224 |
| 8,804,999 B2* | 8/2014 | Ho et al. | ........................ | 382/100 |
| 2009/0074259 A1* | 3/2009 | Baltatu et al. | ................. | 382/118 |
| 2010/0329556 A1* | 12/2010 | Mitarai et al. | ................. | 382/170 |
| 2011/0206246 A1* | 8/2011 | Wolf et al. | ..................... | 382/118 |
| 2012/0213419 A1* | 8/2012 | Kim et al. | ..................... | 382/118 |
| 2012/0269405 A1* | 10/2012 | Kaneda et al. | ................. | 382/118 |
| 2014/0219517 A1* | 8/2014 | Mishra et al. | ................. | 382/118 |

FOREIGN PATENT DOCUMENTS

| | | |
|---|---|---|
| KR | 10-2011-0057595 | 6/2011 |
| KR | 10-2011-0063989 | 6/2011 |
| KR | 10-2012-0007959 | 1/2012 |
| WO | 12/098842 A1 | 7/2012 |

OTHER PUBLICATIONS

M. Heikkilä, M. Pietikäinen, J. Heikkilä, A texture-based method for detecting moving objects, (2004), British Machine Vision Conferenc.*
Cho, Kyu-Bo et al., "Object Detecting Method using Vector Histogram of Local Binary Pattern," Electronics and Telecommunications Research Institute, pp. 278-281 (2012).

* cited by examiner

*Primary Examiner* — Andrae S Allison
(74) *Attorney, Agent, or Firm* — Nelson Mullins Riley & Scarborough LLP

(57) ABSTRACT

A method and apparatus for detecting and recognizing an object using a vector histogram based on a local binary pattern are disclosed. The apparatus of detecting and recognizing an object using a local binary pattern includes: a feature map creator configured to extract an object area in which a moving object exists from an input image, to create a local binary pattern by designating a local area in the object area, and to create a vector component map including information about magnitude vector components and direction vector components using the local binary pattern; a feature map configuring unit configured to divide the object area into a plurality of blocks and to create a feature vector map through a histogram using the vector component map in a unit of the block; and an object detector configured to detect and classify the moving object based on the feature vector map.

16 Claims, 5 Drawing Sheets

MAGNITUDE VECTOR COMPONENT MAP

| M(x-1, y-1) | M(x, y-1) | M(x+1, y-1) |
|---|---|---|
| M(x-1, y) | M(x, y) | M(x+1, y-1) |
| M(x-1, y+1) | M(x, y+1) | M(x+1, y+1) |

FIG. 5B

DIRECTION VECTOR COMPONENT MAP

| θ(x-1, y-1) | θ(x, y-1) | θ(x+1, y-1) |
|---|---|---|
| θ(x-1, y) | θ(x, y) | θ(x+1, y-1) |
| θ(x-1, y+1) | θ(x, y+1) | θ(x+1, y+1) |

FIG. 7

METHOD AND APPARATUS FOR DETECTING AND RECOGNIZING OBJECT USING LOCAL BINARY PATTERNS

CLAIM FOR PRIORITY

This application claims priority to Korean Patent Application No. 10-2013-0002804 filed on Jan. 10, 2013 in the Korean Intellectual Property Office (KIPO), the entire contents of which are hereby incorporated by reference.

BACKGROUND

1. Technical Field

Example embodiments of the present invention relate in general to a method of detecting objects from images, and more specifically, to a method and apparatus for detecting and recognizing objects using vector histograms based on local binary patterns.

2. Related Art

Technology for detecting and recognizing objects from images has been widely applied to video surveillance systems, and lately, studies into an intelligent video surveillance (IVS) system for preventing intellectual crimes are actively conducted. In particular, an intelligent video surveillance system using image information was first applied to public service fields, and police stations, etc. already introduced forensic science using image information to greatly contribute to crime prevention and criminal arrests.

The IVS system is widely utilized in various places, such as airports, stations, parking lots, department stores, casinos, schools, etc., so that a large amount of video is recorded and monitored.

However, since the collected video is observed and monitored with naked eyes by monitoring workers, it is difficult to properly execute real-time monitoring due to difficulty in concentrating caused by long-time monitoring. That is, relatively insufficient time and labor compared with a large amount of recorded video make it difficult to properly observe or analyze the recorded video.

Accordingly, if a function of automatically detecting actions defined as main events is provided to the IVS system, the problem may be easily solved. Also, if a function of recording the generation times of main events, the locations of event frames, etc. is added when providing an automatic alarm upon detection of events and abnormal behaviors, the IVS system may be effectively managed.

However, in some conventional systems in which a function of detecting persons has been installed, a false alarm is often produced, or the case of failing to detect an intruder is also often generated. The cases are caused when the systems misrecognize an object as a person and vice versa or fail to detect a person although properly detecting motion.

Such detection errors are directly associated with the performance of a detector installed in the corresponding system, and come from insufficient feature information about images used in the detector or poor performance of a detection algorithm.

Particularly, representative ones of various detection methods use Haar-like features, local binary patterns, etc.

The Haar-like features can provide sufficient information in the case of images such as a face having relatively predominant features using a combination of feature points with a simple shape, but has difficulties in detecting a person that appears significantly differently according to his/her clothes' color and shape, a gait, etc.

Also, a method of detecting a person in a specific region through local binary patterns is robust to changes in local lighting since it does not directly use gradation patterns.

However, since the method has no reliable features with respect to geometrical changes (movement, scaling, tiling, etc.) in boundary areas of a specific image, the method may fail to detect a region of specific shape in an environment of limited learning result data.

SUMMARY

Accordingly, example embodiments of the present invention are provided to substantially obviate one or more problems due to limitations and disadvantages of the related art.

Example embodiments of the present invention provide an apparatus of detecting and classifying a moving object from an input image using histograms based on local binary patterns.

Example embodiments of the present invention also provide a method of detecting and classifying a moving object from an input image using histograms based on local binary patterns.

In some example embodiments, an apparatus of detecting and recognizing an object using a local binary pattern includes: a feature map creator configured to extract an object area in which a moving object exists from an input image, to create a local binary pattern by designating a local area in the object area, and to create a vector component map including information about magnitude vector components and direction vector components using the local binary pattern; a feature map configuring unit configured to divide the object area into a plurality of blocks and to create a feature vector map through a histogram using the vector component map in a unit of the block; and an object detector configured to detect and classify the moving object based on the feature vector map.

The feature map creator may include a local binary pattern creator configured to designate the local area in the object area, to compare the pixel value of the center pixel of the local area to the pixel values of adjacent pixels neighboring the center pixel to create binary pattern values, and to allocate the binary pattern values to the adjacent pixels, respectively.

The local binary pattern creator may apply predetermined weights to the binary pattern values to create a local binary pattern value and allocate the local binary pattern value to the center pixel to create a local binary pattern.

The feature map creator may further include a vector component map creator configured to add vectors whose start points are the center pixel and whose end points are the adjacent pixels based on the local binary pattern, thereby creating a vector component map.

The feature map configuring unit may include a feature point creator configured to accumulate the direction vector components weighted by the magnitude vector components on the histogram in a unit of the block, thereby creating feature points.

The feature map configuring unit may further include a feature vector normalizer configured to normalize feature vectors connecting the feature points to each other, thereby creating a feature vector map.

The object detector may detect and classify a moving object including a person or a vehicle based on the feature vector map.

The object detector may classify the moving object using a neural network method or a support vector machine (SVM).

The input image may be configured with a plurality of images photographed at predetermined time intervals.

In other example embodiments, a method of detecting and recognizing an object using a local binary pattern includes: extracting an object area in which a moving object exists from an input image and creating a local binary pattern by designating a local area in the object area; creating a vector component map including information about magnitude vector components and direction vector components using the local binary pattern; and dividing the object area into a plurality of blocks and creating a feature vector map through a histogram using the vector component map in a unit of the block.

The method may further include detecting and classifying the moving object based on the feature vector map.

The apparatus and method of detecting and recognizing the object using the local binary pattern, as described above, can detect, recognize, and classify moving objects from images with characteristics robust to changes in geometrical changes as well as changes in light since they use feature vectors through histograms.

Accordingly, it is possible to reliably detect moving objects from an input image and classify the detected moving objects.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises", "comprising,", "includes," and/or "including", when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the appended drawings.

Figure 1:
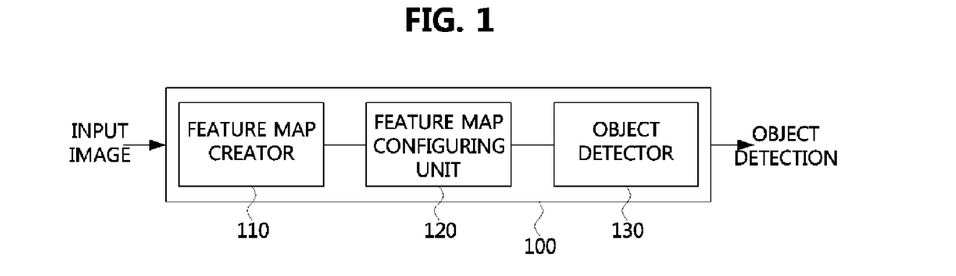
FIG. 1 is a block diagram showing an apparatus of detecting and recognizing an object using local binary patterns, according to an embodiment of the present invention.

FIG. 1 is a block diagram showing an apparatus 100 of detecting and recognizing an object using local binary patterns, according to an embodiment of the present invention.

Referring to FIG. 1, the object detection and recognition apparatus 100 includes a feature map creator 110, a feature map configuring unit 120, and an object detector 130.

The feature map creator 110 may extract an object area in which a moving object exists from an input image, create a local binary pattern by designating a local area in the object area, and create a vector component map including information about magnitude vector components and direction vector components using the created local binary pattern.

Here, the input image may be configured with images photographed at predetermined time intervals. That is, the input image may be an image photographed by a CCTV, etc., and the frame rate, resolution, etc. of the image may depend on a photographing place or a photographing spot.

The higher frame rate and resolution of an input image increase the detection accuracy of a moving object, however, accompany a large amount of data to be processed.

For example, an input image may have a low frame rate in an environment, such as the entrance of a building, a corridor, etc., in which an object moves slowly, and a high frame rate in an environment, such as a road, etc., in which an object moves fast.

The feature map creator 110 may extract an object area in which a moving object exists from an input image. The object area in which the moving object exists may have different image features from a background area. For example, the object area may have complicated motion or colors, or definite edges compared to a background area.

The feature map creator 110 may designate a local area having a predetermined size in the object area to thereby create a local binary pattern. The local binary pattern is used to effectively recognize letters and created by setting a reference value in a pixel region and representing pixel values in the form of binary numerals represented by "0" and "1" through comparison between the reference value and its adjacent values.

For example, in a block having a 3×3 size, the pixel value of a center pixel may be set to a reference value, and the pixel values of eight pixels neighboring the center pixel may be adjacent values. That is, by comparing the pixel value of a center pixel to the pixel values of eight pixels neighboring the center pixel and representing the pixel values of the eight pixels in the form of binary numerals represented by "0" and "1", a local binary pattern may be created. Also, the feature map creator 110 multiplies the binary numerals represented by "0" and "1" by predetermined weights to thereby create a local binary pattern.

The feature map creator 110 may use the local binary pattern to create a vector component map including information about magnitude vector components and direction vector components. For example, the feature map creator 110 may create a vector component map by adding vectors whose start points are the center pixel and whose end points are the adjacent pixels of the center pixel based on the local binary pattern. Here, the start point and the end points may be adjusted within a predetermined range. Accordingly, the start point is not limited to the central location of the center pixel, and the end points are not limited to the central locations of the adjacent pixels.

The feature map configuring unit 120 may divide the object area into several blocks and create a feature vector map in a unit of the block using a histogram based on the vector component map.

Here, the size of each block may be set according to the features of the corresponding image, or set in advance by a user. In the current embodiment, the size of each block may be arbitrarily set. That is, the blocks are not limited in terms of size and shape.

The vector component map is configured to include a magnitude vector component map and a direction vector component map. Accordingly, the feature map configuring unit 120 accumulates direction vector components weighted by magnitude vector components in a unit of the block to create a histogram.

That is, the feature map configuring unit 120 may create feature points that are represented as a histogram in a unit of the block and create feature vectors connecting the feature points to each other. Also, the feature map configuring unit 120 may normalize the feature vectors connecting the feature points to each other to create a feature vector map.

The object detector 130 may detect and classify the moving object based on the feature vector map. The object detector 130 may use a neural network method or a support vector machine (SVM). The moving object may include a person, a vehicle, etc.

Figure 2:
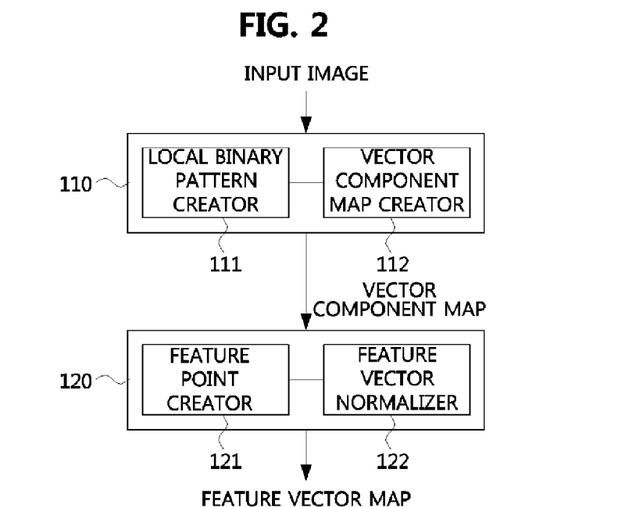
FIG. 2 is a block diagram showing a feature map creator and a feature map configuring unit included in the object detection and recognition apparatus shown in FIG. 1, in detail.

FIG. 2 is a block diagram showing the feature map creator 110 and the feature map configuring unit 120 included in the object detection and recognition apparatus 100 shown in FIG. 1, in detail.

Referring to FIG. 2, the feature map creator 110 includes a local binary pattern creator 111 and a vector component map creator 112.

The local binary pattern creator 111 may create a local binary pattern by designating a local area in an input image.

For example, the local binary pattern creator 111 may compare the pixel value of the center pixel of the local area to the pixel values of adjacent pixels neighboring the center pixel to create binary pattern values, and allocate the binary pattern values to the adjacent pixels, respectively. Here, the local area may be a block having a 3×3 size.

The local binary pattern creator 111 may multiply the binary pattern values by predetermined weights to create a local binary pattern value, and allocate the local binary pattern value to the center pixel, thereby creating a local binary pattern.

The vector component map creator 112 may create a vector component map by adding vectors whose start points are the center pixel and whose end points are the adjacent pixels of the center pixel.

That is, the vector component map creator 112 may create a magnitude vector component map including information about magnitude vector components and a direction vector component map including information about direction vector components, in a unit of the local area. Here, the magnitude vector component map represents the magnitudes of vectors and can be expressed as scalar values, and the direction vector component map represent the directions of vectors and can be expressed as angular values.

Referring to FIG. 2, the feature map configuring unit 120 includes a feature point creator 121 and a feature vector normalizer 122.

The feature point creator 121 may accumulate direction vector components weighted by magnitude vector components in a unit of the block on a histogram to create feature points.

Also, the feature vector normalizer 122 may normalize feature vectors connecting the feature points to each other to create a feature vector map.

Figure 3:
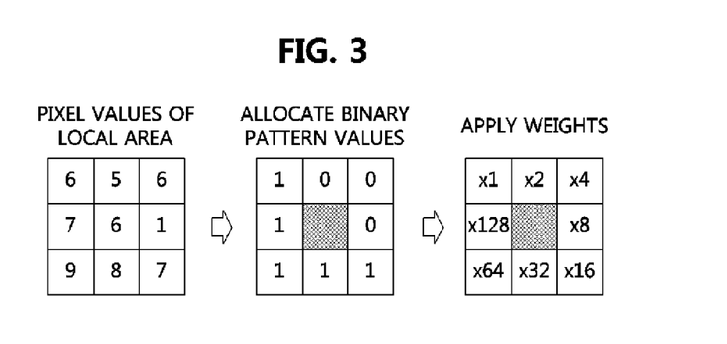
FIG. 3 is a conceptual view for explaining creation of a local binary pattern, according to an embodiment of the present invention.

FIG. 3 is a conceptual view for explaining creation of a local binary pattern, according to an embodiment of the present invention.

Referring to FIG. 3, the local binary pattern may be created by designating a local area having a 3×3 size.

As shown in the left block of FIG. 3, the pixel value of the center pixel of the block having a 3×3 size is 6, and eight adjacent pixels are located around the center pixel. The pixel values of the adjacent pixels are 6, 5, 6, 1, 7, 8, 9, and 7 in a clockwise direction.

By comparing the pixel value of the center pixel to the pixel values of the adjacent pixels, binary pattern values may be created, and the created binary pattern values may be allocated to the respective adjacent pixels. Here, the binary pattern values may be represented as "0" and "1".

For example, if the pixel values of the adjacent pixels are greater than the pixel value of the center pixel, the corresponding binary pattern values may be set to "1", and if the pixel values of the adjacent pixels are smaller than the pixel value of the center pixel, the corresponding binary pattern values may be set to "0".

Accordingly, as shown in the middle block of FIG. 3, the binary pattern values may be allocated to the respective adjacent pixels.

Then, by multiplying the binary pattern values by predetermined weight values and summing the results of the multiplication, a local binary pattern value may be created, and the created local binary pattern value may be allocated to the center pixel. That is, by allocating the local binary pattern value to the center pixel, a local binary pattern may be created.

For example, as shown in the right block of FIG. 3, by multiplying the binary pattern values allocated to the respective adjacent pixels by weights of 1, 2, 4, 8, 16, 64, and 128 (in a clockwise direction) and adding the results of the multiplication to create a local binary pattern value, the local binary pattern value may be allocated to the center pixel. Accordingly, the local binary pattern value may be calculated as 241 (=1+16+32+64+128), and the value 241 may be allocated to the center pixel.

By performing the process described above on the object area, a local binary pattern may be created. That is, a local binary pattern performs a process of allocating a local binary pattern value to a center pixel on the pixels of a local area to replace the pixel values of the individual pixels with local binary pattern values.

$$LBP(x_c, y_c) = \sum_{p=0}^{7} s(g_c - g_p)2^p \quad (1)$$

$$s(x) = \begin{cases} 1 & \text{if } x \geq 0 \\ 0 & \text{otherwise} \end{cases}$$

Equation 1 explains creation of a local binary pattern value. In equation 1, $g_c$ represents the brightness value of a center pixel $(x_c, y_c)$, and $g_p$ represents the brightness value of an adjacent pixel $(x_p, y_p)$.

Figure 4:
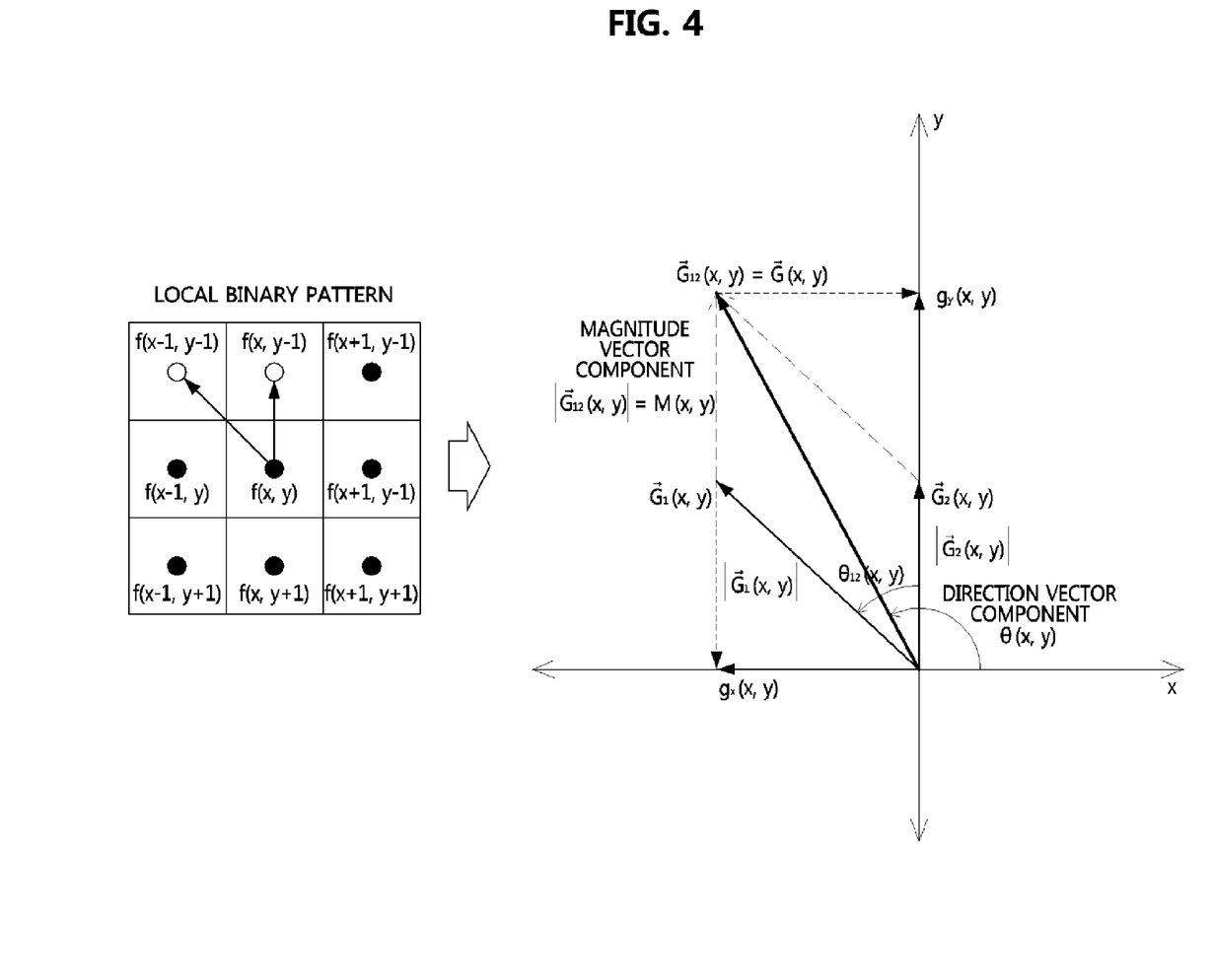
FIG. 4 is a conceptual view for explaining creation of a vector component map, according to an embodiment of the present invention.

FIG. 4 is a conceptual view for explaining creation of a vector component map, according to an embodiment of the present invention.

Referring to FIG. 4, a vector component map may be created using a local binary pattern.

The vector component map may include information about magnitude vector components and direction vector components. That is, the vector component map may be configured with a magnitude vector component map and a direction vector component map.

That is, in each local area that is represented as a local binary pattern, a vector component map may be created by adding vectors whose start points are the center pixel and whose end points are the adjacent pixels.

A local binary pattern value obtained by multiplying binary pattern values respectively allocated to the adjacent pixels by predetermined weights and adding the results of the multiplication may be allocated to the center pixel, and a vector component map may be created based on the local binary pattern value.

For example, the magnitude and direction of a vector whose end point is an adjacent pixel to which a binary pattern value of 0 has been allocated may be zero. That is, by adding vectors whose end points are adjacent pixels to which a binary pattern value of 1 has been allocated, a vector component map may be created.

The left block of FIG. 4 shows a local binary pattern created by allocating a local binary pattern value. In the left block of FIG. 4, adjacent pixels on which white points have been denoted are pixels to which a binary pattern value of 1 has been allocated, and adjacent pixels on which black points have been denoted are pixels to which a binary pattern value of 0 has been allocated. Accordingly, vectors whose end points are adjacent pixels on which white points have been denoted may be used to create a vector component map.

$$\vec{G}(x, y) = M(x, y) \angle \theta(x, y) \quad (2)$$

$$\vec{G}(x, y) = \sum_{p=0}^{7} \vec{G_p}(x, y)$$

$$\text{if) } \vec{G_{i,j}}(x, y) = \vec{G_i}(x, y) + \vec{G_j}(x, y), i, j < 8$$

$$\angle \vec{G_{ij}}(x, y) = \cos^{-1}\left(\frac{\vec{G_i}(x, y) \cdot \vec{G_j}(x, y)}{|\vec{G_i}(x, y)||\vec{G_j}(x, y)|}\right)$$

$$|\vec{G_{ij}}(x, y)| = \sqrt{|\vec{G_i}(x, y)|^2 + |\vec{G_j}(x, y)|^2 + 2|\vec{G_i}(x, y)||\vec{G_j}(x, y)|\cos\theta}$$

Equation 2 explains creation of a vector component map. That is, information about magnitude vector components and direction vector components may be calculated according to equation 2.

In equation 2, $\vec{G}(x,y)$ is an addition of vectors based on adjacent pixels to which a binary pattern value of 1 has been allocated. Also, $|\vec{G_{ij}}(x,y)|$ represents information of a magnitude corresponding to the addition of the vectors, and $\angle G_{ij}(x,y)$ represents information of a direction corresponding to the addition of the vectors.

$$\vec{G}(x, y) = \left[\sum_{a,b} a \cdot f(x+a, y+b), \sum_{a,b} b \cdot f(x+a, y+b)\right]^T, \quad (3)$$

$$-\frac{w-1}{2} \leq a, b \leq -\frac{w-1}{2}.$$

$$g_x(x, y) = \sum_{a,b} a \cdot f(x+a, y+b)$$

$$g_y(x, y) = \sum_{a,b} b \cdot f(x+a, y+b)$$

$$M(x, y) = \sqrt{g_x^2(x, y) + g_y^2(x, y)}$$

$$\theta(x, y) = a\tan2[g_y(x, y), g_x(x, y)] + \pi$$

Equation 3 explains a method of creating a vector component map by defining a window size ω for setting adjacent pixels.

Referring to FIG. 4 and equation 3, f(x,y) represents the local binary pattern value of a pixel located at (x, y), and $f(x+x_0, y+y_0)$ represents the local binary pattern value of a pixel at a location moved by a in the x-axis and by b in the y-axis from (x, y). $g_x(x,y)$ represents the x component of $\vec{G}(x,y)$, and $g_y(x,y)$ represents the y component of $\vec{G}(x,y)$. Also, M(x,y) may represent information about the magnitude vector component of $\vec{G}(x,y)$ and θ(x,y) may represent information about the direction vector component of $\vec{G}(x,y)$.

Accordingly, equation 3 may be used to create a vector component map including information about magnitude vector components and direction vector components by designating a local area.

Figure 5A:
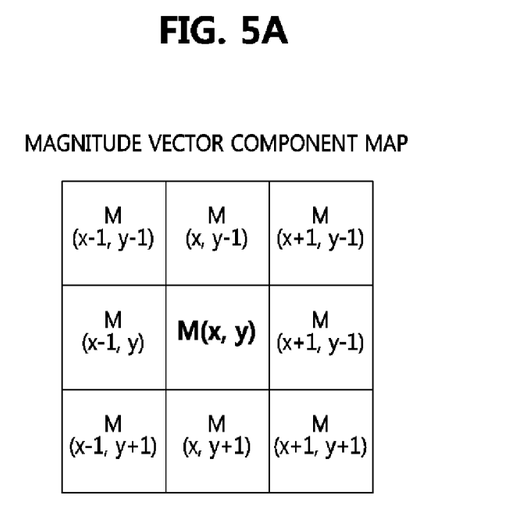
FIGS. 5A and 5B show examples of vector component maps.
Figure 5B:
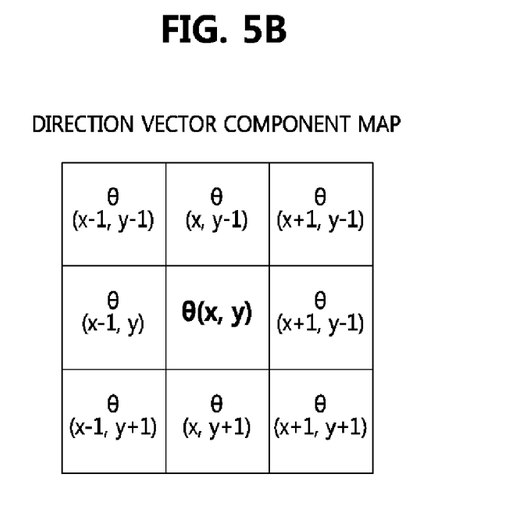

FIGS. 5A and 5B show examples of vector component maps, wherein FIG. 5A shows an example of a magnitude vector component map, and FIG. 5B shows an example of a direction vector component map. That is, a vector component map may be represented as a magnitude vector component map and a direction vector component map. Here, the magnitude vector component map represents the magnitudes of vectors and can be expressed as scalar values, and the direction vector component map represents the directions of the vectors and can be expressed as angular values.

Accordingly, each center pixel may be expressed as a scalar value and an angular value using a local binary pattern, thereby creating a magnitude vector component map and a direction vector component map.

Figure 6:
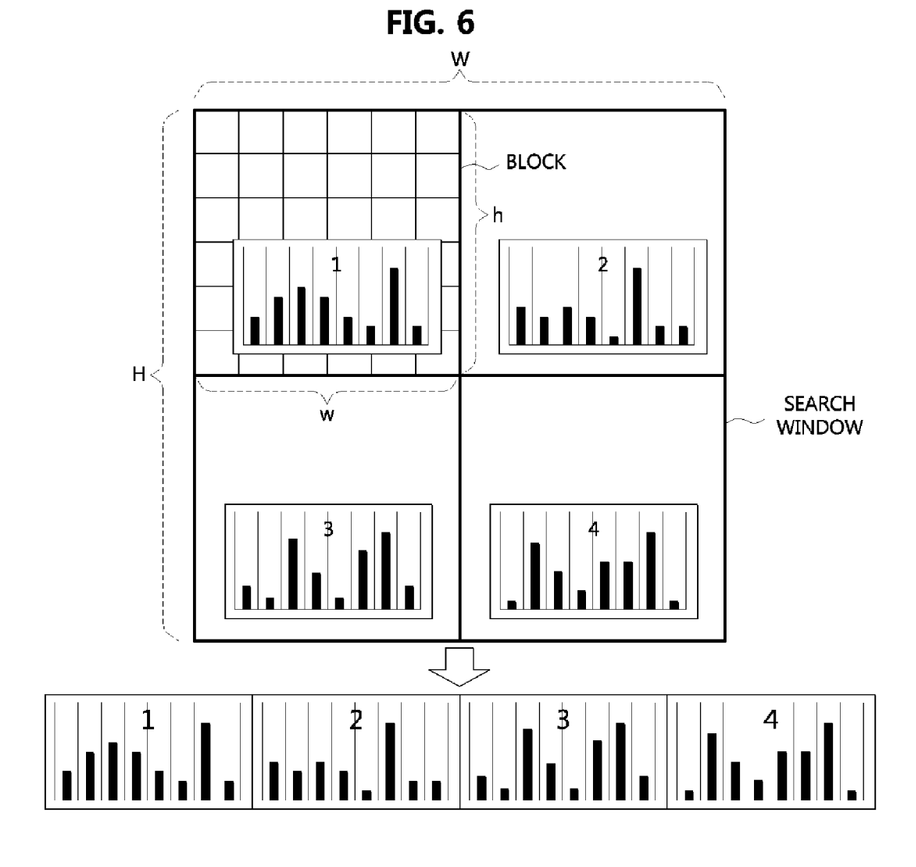
FIG. 6 is a conceptual view for explaining creation of a feature vector map based on vector histograms, according to an embodiment of the present invention.

FIG. 6 is a conceptual view for explaining creation of a feature vector map based on a vector histogram, according to an embodiment of the present invention.

Referring to FIG. 6, an object area may be divided into several blocks, and a feature vector map may be created through a histogram using a vector component map in a unit of the block.

The histogram may be created by accumulating direction vector components weighted by magnitude vector components in a unit of the block. The created histogram may show the features of an image including a moving object. Accordingly, feature points that are represented as a histogram in a unit of the block may be created, and feature vectors connecting the feature points to each other may be created.

For example, in FIG. 6, a search window having a W×H size may be divided into four blocks. That is, the search window may be divided into four blocks, and a histogram for each block may be created.

Accordingly, if the size of a block is set to w×h, a search window may be divided into $S_w \times S_h$ blocks, and a histogram for each block may be created, wherein $S_w = W/w$ and $S_h = H/h$.

$$bw = 2\pi / bn \quad (4)$$

$$b_s(i) = \left\lfloor \frac{\theta(x, y)}{bw} \right\rfloor$$

Equation 4 explains a method of creating feature points by accumulating direction vector components weighted by magnitude vector components in a unit of the block.

bn bins may be allocated to each block, wherein bn is determined by bw (bin-width), and then a direction vector component map $\theta(x,y)$ may be weighted by a magnitude vector component map $M(x,y)$ and accumulated to create an index $b_s(i)$, wherein bw represents a bin-width, bn represents the number of bins, and $b_s(i)$ represents a bin index.

Feature points that are represented as a histogram in a unit of the block may be created, and feature vectors connecting the feature points to each other may be created.

For example, $S_w \times S_h$ feature points exist in the unit of each block, and the $S_w \times S_h$ feature points are connected to create a feature vector of a $\vec{V}(x,y)$ $S_w \times S_h \times bn$ dimension.

$$\vec{V}_{norm}(x, y) = |\vec{V}_{norm}(x, y)| \angle \theta(x, y) \quad (5)$$

$$|\vec{V}_{norm}(x, y)| = \frac{(|V(x, y)| - V^{min})(V_{norm}^{max} - V_{norm}^{min})}{V^{max} - V^{min}} + V_{norm}^{min}$$

Equation 5 is an equation for normalizing the feature vector $\vec{V}(x,y)$. That is, the feature vector $\vec{V}(x,y)$ may be normalized to create a feature vector map $\vec{V}_{norm}(x,y)$.

In equation 5, $V^{min}$ represents the minimum magnitude value of the feature vector map $\vec{V}_{norm}(x,y)$, $V^{max}$ represents the maximum magnitude value of the feature vector map $\vec{V}_{norm}(x,y)$, and $V_{norm}^{min}$ and $V_{norm}^{max}$ may respectively represent the minimum and maximum magnitude values of a predetermined, normalized feature vector map. Also, $|\vec{V}_{norm}(x,y)|$ may represent the magnitude of a feature vector map at a location (x,y).

Accordingly, in the current embodiment, the feature vector $\vec{V}(x,y)$ connecting the feature points to each other may be normalized to create the feature vector map $\vec{V}_{norm}(x,y)$.

Also, according to the current embodiment, moving objects may be detected and classified based on a feature vector map. That is, objects may be detected and classified using a neural network method or an SVM.

The neural network method is effective for letters recognition, object recognition, etc., and detects objects by learning the patterns of various objects. Also, the SVM minimizes classification errors and can perform a high-speed operation while reducing an error rate, compared to other conventional methods.

The components configuring the apparatus of detecting and recognizing the object using the local binary pattern, according to the current embodiment, are shown and described as separate units for convenience of description, however, at least two of the components may configure a single component, or one component may be divided into a plurality of components to perform the corresponding function. Embodiments in which the components are integrated or divided should be deemed to be included in the scope of the invention as long as they are within the technical idea of the present invention.

Also, the operation of the apparatus of detecting and recognizing the object using the local binary pattern, according to the current embodiment, can be embodied as computer readable programs or codes on a computer readable recording medium. The computer readable recording medium is any data storage device that can store data which can be thereafter read by a computer system. The computer readable recording medium can also be distributed over network-coupled computer systems so that the computer readable code is stored and executed in a distributed fashion.

Figure 7:
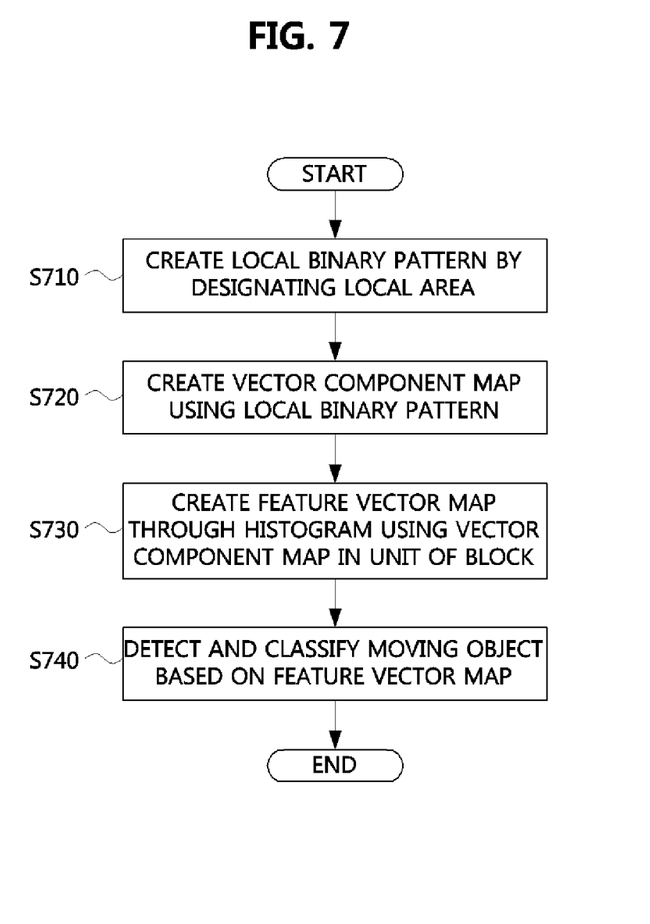
FIG. 7 is a flowchart showing a method of detecting and recognizing an object using local binary patterns, according to an embodiment of the present invention.

FIG. 7 is a flowchart showing a method of detecting and recognizing an object using a local binary pattern, according to an embodiment of the present invention.

Referring to FIG. 7, the method of detecting and recognizing the object using the local binary pattern includes creating a local binary pattern (S710), creating a vector component map (S720), creating a feature vector map (S730), and detecting a moving object (S740).

The method of detecting and recognizing the object using the local binary pattern may be performed by the apparatus 100 of detecting the object using the local binary pattern, as described above. Accordingly, the method of detecting and recognizing the object using the local binary pattern may be understood with reference to the above descriptions about the apparatus 100 of detecting and recognizing the object using the local binary pattern.

An object area in which a moving object exists may be extracted from an input image, and a local binary pattern may be created by designating a local area in the object area (S710).

That is, a local area may be designated in an object area of an input image, the magnitude of the pixel value of the center pixel of the local area may be compared to the magnitudes of the pixel values of adjacent pixels neighboring the center pixel to create binary pattern values, and the binary pattern values may be allocated to the respective adjacent pixels.

Then, the binary pattern values may be multiplied by weights, the results of the multiplication may be added to create a local binary pattern value, and the local binary pattern value may be allocated to the center pixel to create a local binary pattern.

For example, the pixel value of the center pixel of a block having a 3×3 size may be set to a reference value, and the pixel values of eight pixels adjacent to the center pixel may be set to adjacent values. That is, by comparing the pixel value of a center pixel to the pixel values of eight pixels neighboring the center pixel and representing the pixel values of the eight pixels in the form of binary numerals represented by "0" and "1", a local binary pattern may be created. Also, by multiplying the binary numerals represented by "0" and "1" by predetermined weights, a local binary pattern may be created.

The local binary pattern may be used to create a vector component map including information about magnitude vector components and direction vector components (S720). For example, by adding vectors whose start points are the center pixel and whose end points are the adjacent pixels, a vector component map may be created.

Then, the object area may be divided into several blocks, and a feature vector map may be created through a histogram using the vector component map in a unit of the block (S730).

For example, a histogram may be created by accumulating direction vector components weighted by magnitude vector components in the unit of each block. Feature points that are represented as a histogram in the unit of each block may be created, and a feature vector $\vec{V}(x,y)$ connecting the feature points to each other may be created.

Also, the feature vector $\vec{V}(x,y)$ connecting the feature points to each other may be normalized to create a feature vector map $\vec{V}_{norm}(x,y)$.

Then, the moving object may be detected and classified based on the feature vector map $\vec{V}_{norm}(x,y)$ (S740). For example, the neural network method or the SVM may be used to detect and classify a moving object including a person, a vehicle, etc.

The apparatus and method of detecting and recognizing the object using the local binary pattern, as described above, are robust to changes in geometrical changes as well as changes in lighting since they use feature vectors through histograms.

Therefore, according to the embodiments of the present invention, it is possible to reliably detect moving objects from an input image and classify the detected moving objects.

While the example embodiments of the present invention and their advantages have been described in detail, it should be understood that various changes, substitutions, and alterations may be made herein without departing from the scope of the invention.

What is claimed is:

1. An apparatus of detecting and recognizing an object using a local binary pattern, comprising:
a feature map creator configured to extract an object area in which a moving object exists from an input image, to create a local binary pattern by designating a local area in the object area, and to create a vector component map comprising information about magnitude vector components and direction vector components using the local binary pattern;
a feature map configuring unit configured to divide the object area into a plurality of blocks and to create a feature vector map through a histogram using the vector component map in a unit of the block, wherein the feature map configuring unit comprises a feature point creator configured to accumulate the direction vector components weighted by the magnitude vector components on the histogram in the unit of the block, thereby creating feature points; and
an object detector configured to detect and classify a moving object based on the feature vector map.

2. The apparatus of claim 1, wherein the feature map creator comprises a local binary pattern creator configured to designate the local area in the object area, to compare the pixel value of the center pixel of the local area to the pixel values of adjacent pixels neighboring the center pixel to create binary pattern values, and to allocate the binary pattern values to the adjacent pixels, respectively.

3. The apparatus of claim 2, wherein the local binary pattern creator applies predetermined weights to the binary pattern values to create a local binary pattern value and allocates the local binary pattern value to the center pixel to create the local binary pattern.

4. The apparatus of claim 3, wherein the feature map creator further comprises a vector component map creator configured to add vectors whose start points are the center pixel and whose end points are the adjacent pixels based on the local binary pattern, thereby creating the vector component map.

5. The apparatus of claim 1, wherein the feature map configuring unit further comprises a feature vector normalizer configured to normalize feature vectors connecting the feature points to each other, thereby creating the feature vector map.

6. The apparatus of claim 1, wherein the object detector detects and classifies the moving object comprising a person or a vehicle based on the feature vector map.

7. The apparatus of claim 6, wherein the object detector classifies the moving object using a neural network method or a support vector machine (SVM).

8. The apparatus of claim 1, wherein the input image is configured with a plurality of images photographed at predetermined time intervals.

9. A method of detecting and recognizing an object using a local binary pattern, comprising:
extracting an object area in which a moving object exists from an input image, and creating a local binary pattern by designating a local area in the object area;
creating a vector component map comprising information about magnitude vector components and direction vector components using the local binary pattern
dividing the object area into a plurality of blocks; and
creating a feature vector map through a histogram using the vector component map in a unit of the block, wherein the creating of the feature vector map comprises accumulating the direction vector components weighted by the magnitude vector components on the histogram in the unit of the block to create feature points.

10. The method of claim 9, wherein the creating of the local binary pattern comprises designating the local area in the object area, comparing the pixel value of the center pixel of the local area to the pixel values of adjacent pixels neighboring the center pixel to create binary pattern values, and allocating the binary pattern values to the adjacent pixels, respectively.

11. The method of claim 10, wherein the creating of the local binary pattern comprises applying predetermined weights to the binary pattern values to create a local binary pattern value and allocates the local binary pattern value to the center pixel to create the local binary pattern.

12. The method of claim 9, wherein the creating of the vector component map comprises adding vectors whose start points are the center pixel and whose end points are the adjacent pixels based on the local binary pattern, thereby creating the vector component map.

13. The method of claim 9, wherein the creating of the feature vector map comprises:
normalizing feature vectors connecting the feature points to each other to create the feature vector map.

14. The method of claim 9, further comprising detecting and classifying the moving object based on the feature vector map.

15. The method of claim 14, wherein the detecting and classifying of the moving object comprises detecting and classifying the moving object comprising a person or a vehicle using a neural network method or a support vector machine (SVM).

16. The method of claim 9, wherein the input image is configured with a plurality of images photographed at predetermined time intervals.

\* \* \* \* \*